United States Patent
Kotaki (10) Patent No.: US 10,036,637 B2
(45) Date of Patent: Jul. 31, 2018

(54) ELECTRONIC DEVICE AND INFORMATION NOTIFICATION METHOD

(71) Applicant: Seiko Epson Corporation, Shinjuku-ku (JP)

(72) Inventor: Tadasuke Kotaki, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/224,373

(22) Filed: Jul. 29, 2016

(65) Prior Publication Data
US 2017/0038215 A1    Feb. 9, 2017

(30) Foreign Application Priority Data
Aug. 3, 2015    (JP) .................. 2015-153164

(51) Int. Cl.
| | |
|---|---|
| *G01C 21/20* | (2006.01) |
| *G09G 5/02* | (2006.01) |
| *G09B 5/02* | (2006.01) |
| *G09B 19/00* | (2006.01) |

(52) U.S. Cl.
CPC .............. *G01C 21/20* (2013.01); *G09B 5/02* (2013.01); *G09B 19/0038* (2013.01)

(58) Field of Classification Search
CPC ....... G01C 21/20; G09B 19/0038; G09B 5/02
USPC ......................................................... 701/433
See application file for complete search history.

(56) References Cited

U.S. PATENT DOCUMENTS

| | | | |
|---|---|---|---|
| 2007/0024501 A1* | 2/2007 | Yeh ................. | G01C 21/20 342/357.52 |
| 2015/0039263 A1* | 2/2015 | Hasegawa ......... | G01C 5/00 702/166 |

FOREIGN PATENT DOCUMENTS

| | | |
|---|---|---|
| JP | 11-271086 A | 5/1999 |
| JP | 2010-223820 A | 7/2010 |
| JP | 2010-227146 A | 10/2010 |

* cited by examiner

*Primary Examiner* — Brian P Sweeney
(74) *Attorney, Agent, or Firm* — Kilpatrick Townsend & Stockton LLP (57) ABSTRACT

A portable electronic device includes a notification unit which notifies a user of information regarding a cumulative increase amount from a current point to a target point in a route designated in advance, or information regarding a cumulative decrease amount from the current point to the target point.

22 Claims, 7 Drawing Sheets

ELECTRONIC DEVICE AND INFORMATION NOTIFICATION METHOD

CROSS-REFERENCE TO RELATED APPLICATIONS

The entire disclosure of Japanese Patent Application No. 2015-153164, filed Aug. 3, 2015 is expressly incorporated by reference herein.

BACKGROUND

1. Technical Field

The present invention relates to an electronic device and an information notification method.

2. Related Art

Motivation of many of climbers goes up when the summit is seen when climbing a mountain. However, when climbing does not progress easily although the summit is seen, motivation goes down and climbers easily feel fatigued. It is known that even during a descent from the summit, in a case where a return place cannot be seen, an approximate distance to the return place cannot be measured and a movement time feels long.

Here, a portable route schedule management device is proposed (see JP-A-2010-223820). Before a predetermined period of time from an estimated time for arrival at a next point or when the distance between a current point and the next point is in a predetermined range, the device notifies a user of that effect.

However, during climbing, even though remaining movement distances to next points are the same, the degree of fatigue varies depending on whether or not a road surface to a next point is flat. Therefore, notification of movement distances is not necessarily effective for climbers.

SUMMARY

An advantage of some aspects of the invention is that it provides an electronic device and an information notification method in which meaningful information regarding remaining journey (journey from a current point to a target point) of a route including ups and downs can be notified to a user.

The invention can be implemented as the following aspects or application examples.

Application Example 1

A portable electronic device according to this application example includes: a notification unit which notifies a user of information regarding a cumulative increase amount from a current point to a target point in a route designated in advance, or information regarding a cumulative decrease amount from the current point to the target point.

Here, the "current point" is a point which is a reference when the remaining cumulative increase amount or the remaining cumulative decrease amount is calculated, and is a point where the electronic device is positioned when the cumulative increase amount or the cumulative decrease amount is calculated. A timing at which the cumulative increase amount or the cumulative decrease amount is calculated and a timing at which the cumulative increase amount or the cumulative decrease amount is notified may not be completely coincident with each other. For example, a delay time such as a time necessary for calculation or a time necessary for notification may be provided between calculation and notification. In addition, for example, in a case where calculation of a position or the like is performed at a predetermined time interval, a position closest to a time at which the cumulative increase amount or the cumulative decrease amount is calculated may be used as a current position. Therefore, the "current point" may not be completely coincident with a point where the electronic device is actually positioned at a time at which the cumulative increase amount or the cumulative decrease amount is calculated or notified.

For example, during walking on a route with ups and downs, the movement amount in an altitude direction significantly influences motivation of the user. The notification unit according to the application example notifies the user of the information regarding the cumulative increase amount or the cumulative decrease amount until the target point. The user may recognize the amount of remaining ascents or the amount of remaining descents until the target point through the notification by the electronic device. Accordingly, the electronic device according to the application example is effective in, for example, maintaining motivation of the user or reexamining the route.

Application Example 2

The electronic device according to the application example may further include a storage unit which stores information representing a distribution of altitudes of the route, and the notification unit may notify the information regarding the cumulative increase amount or the information regarding the cumulative decrease amount on the basis of the information representing the distribution of altitudes.

Therefore, the notification unit may notify the information regarding the remaining cumulative increase amount or the information regarding the remaining cumulative decrease amount based on the distribution of altitudes of the route. Accordingly, the electronic device may appropriately notify the user of the remaining cumulative increase amount or the remaining cumulative decrease amount.

Application Example 3

In the electronic device according to the application example, the information regarding the cumulative increase amount may include a remaining cumulative increasing altitude which is necessary for movement from the current point to the target point or a remaining cumulative increasing time which is necessary for movement from the current point to the target point, and the information regarding the cumulative decrease amount may include a remaining cumulative decreasing altitude which is necessary for movement from the current point to the target point or a remaining cumulative decreasing time which is necessary for movement from the current point to the target point.

Therefore, the notification unit may notify the user of the amount of remaining ascents or the amount of remaining descents until the target point in terms of altitude or time.

Application Example 4

In the electronic device according to the application example, the notification unit may further notify the user of a cumulative movement distance from the current point to the target point, or a cumulative movement time from the current point to the target point.

The notification unit may further notify the user of the cumulative movement distance or the cumulative movement time until the target point. Therefore, for example, compared to a case where the cumulative movement distance or the cumulative movement time is not notified, the user may recognize the route from the current point to the target point more accurately and easily.

Application Example 5

In the electronic device according to the application example, the target point may be an end point of the route.

Therefore, the notification unit may notify the user of the amount of remaining ascents or the amount of remaining descents until the end point of the route.

Application Example 6

In the electronic device according to the application example, the target point may be an intermediate point of the route designated by the user in advance.

Therefore, the notification unit may notify the user of the amount of remaining ascents or the amount of remaining descents until the intermediate point of the route.

Application Example 7

In the electronic device according to the application example, the electronic device may be able to be worn by a predetermined part of the user.

Therefore, the user can check information without holding the electronic device with a hand. Accordingly, the electronic device is appropriate for sports.

Application Example 8

In the electronic device according to the application example, the predetermined part may be an arm or a wrist.

Therefore, the user may use the electronic device with the same sensation as that of a wristwatch or the like.

Application Example 9

An information notification method according to this application example is an information notification method executed by a portable electronic device, the method including: notifying a user of information regarding a cumulative increase amount from a current point to a target point in a route designated in advance, or information regarding a cumulative decrease amount from the current point to the target point.

For example, during walking on a route with ups and downs, the movement amount in an altitude direction significantly influences motivation of the user. In the information notification method according to the application example, the information regarding the cumulative increase amount or the cumulative decrease amount until the target point is notified to the user. The user may recognize the amount of remaining ascents or the amount of remaining descents until the target point through the notification by the electronic device. Accordingly, the information notification method according to the application example is effective in, for example, maintaining motivation of the user or reexamining the route.

Application Example 10

An information notification program according to this application example is able to be read by a computer mounted in a portable electronic device, and causes the computer to execute notifying a user of information regarding a cumulative increase amount from a current point to a target point in a route designated in advance, or information regarding a cumulative decrease amount from the current point to the target point.

For example, during walking on a route with ups and downs, the movement amount in an altitude direction significantly influences motivation of the user. In the information notification program according to the application example, the information regarding the cumulative increase amount or the cumulative decrease amount until the target point is notified to the user. The user may recognize the amount of remaining ascents or the amount of remaining descents until the target point through the notification by the electronic device. Accordingly, the information notification program according to the application example is effective in, for example, maintaining motivation of the user or reexamining the route.

BRIEF DESCRIPTION OF THE DRAWINGS

The invention will be described with reference to the accompanying drawings, wherein like numbers reference like elements.

FIG. 2 is a function block diagram illustrating the configuration of the electronic device and the like.

DESCRIPTION OF EXEMPLARY EMBODIMENTS

Hereinafter, an exemplary embodiment of the invention will be described in detail with reference to the drawings. The embodiment described below does not unfairly limit the contents of the invention described in the appended claims. In addition, all the configurations described below are not necessarily essential constituents for the invention.

1. Embodiment of Electronic Device 1-1. Summary of Electronic Device

Figure 1:
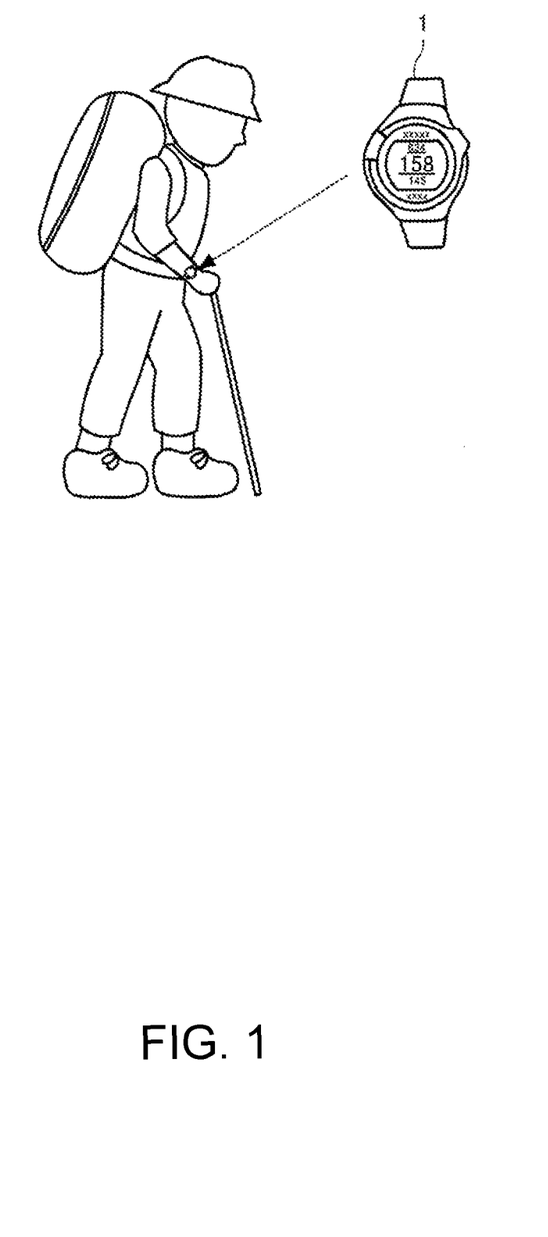
FIG. 1 is a view schematically illustrating an electronic device in a first embodiment.

FIG. 1 is a view schematically illustrating an electronic device in a first embodiment.

As illustrated in FIG. 1, an electronic device 1 (an example of a portable electronic device) in this embodiment is, for example, a portable information device which is worn on a portion of the body of a user in an outdoor scene such as climbing. The wearing position of the electronic device 1 is at a part (forearm) from the elbow to the hand so as to be easily seen by the user as necessary. In the example illustrated in FIG. 1, the electronic device 1 is configured as a wristwatch type portable information device (outdoor watch), and the wearing position of the electronic device 1 is the wrist.

In the electronic device 1, for example, as the functions of the outdoor watch, a timekeeping function, a positioning function, a compass function, an atmospheric pressure detecting function, a navigation function, and the like are mounted. Hereinafter, description will be provided on the assumption that the electronic device 1 is applied to climbing.

In advance preparation for climbing, the user designates a route planned for climbing by operating an information terminal such as a smartphone, a tablet PC, or a desktop PC and registers the route in the electronic device 1 via the information terminal.

On the day of climbing, the user who carries (wears) the electronic device 1 sequentially displays information regarding remaining journey from a current point to a target point in the route registered in advance on a display unit of the electronic device 1. The user appropriately reviews the distribution of paces of the climbing and rest timings with reference to the displayed information. When the user completes the registration of the route or the like in the advance preparation, the user does not need to operate devices other than the electronic device 1 (the information terminal or the like) on the day of climbing.

1-2. Designation of Route

Figure 2:
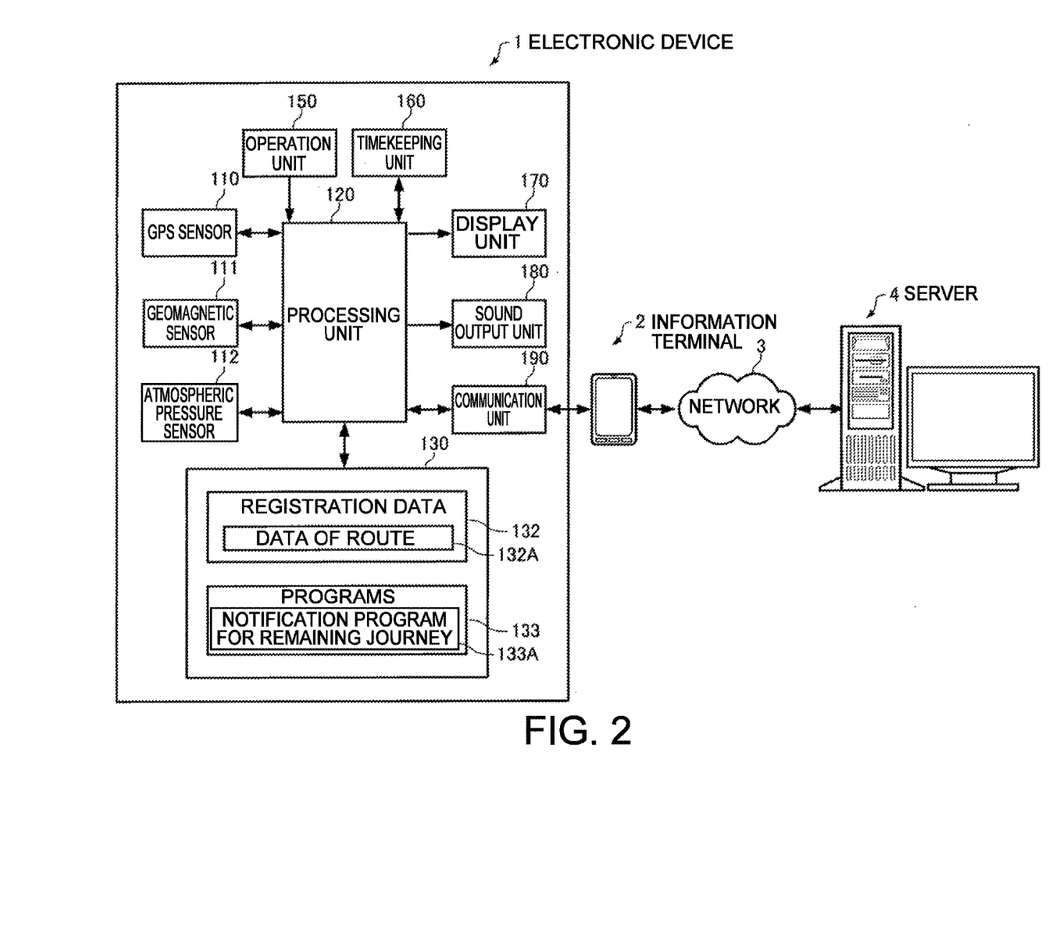

In the advance preparation, for example, as illustrated in FIG. 2, the electronic device 1 is connected to an information terminal 2, and the information terminal 2 is connected to a network 3 such as Internet. Hereinafter, a case where a touch panel is used as a user interface of the information terminal 2 is postulated.

First, the user accesses a network server 4 by operating the information terminal 2, causes a map of a desired area in a map of the world accumulated in the network server 4 to be displayed on a display screen (touch panel type display or the like) of the information terminal 2, and reads the map. The map may not be a map of the world as long as a map of a necessary area is included. For example, the map may be a map of the northern hemisphere, a map of Asia, a map of the USA, or a map of countries in the world. In addition, the user expands, reduces, or scrolls the map on the information terminal 2 to cause an area including the desired route to be displayed on the information terminal 2.

Figure 3:
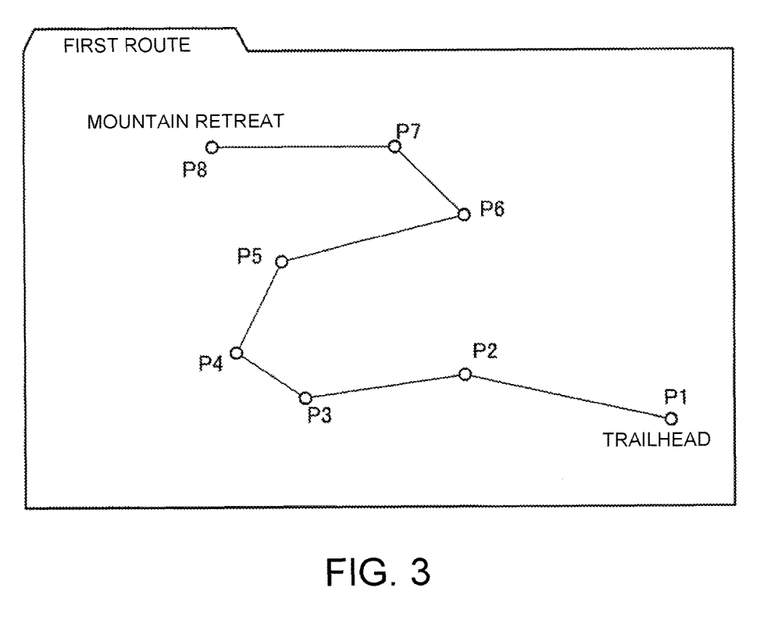
FIG. 3 is a view for explaining an example of a method of designating a route by a user.

Next, as illustrated in FIG. 3, the user sequentially designates (touches) points P1, P2, P3, . . . of the route from the start point P1 of the route, and when the designation of an end point (in FIG. 3, a point P8) of the route is completed, the user inputs a notification of the completion to the information terminal 2.

A "point" mentioned here is any position on the route. Points on the route may be arbitrary points included in route data. Therefore, the "points" may include a point where a certain event (rest, lunch, or the like) is planned by the user (event point), a branch point to another route, or other points.

The information terminal 2 regards a route formed by connecting a plurality of the points P1, P2, P3, . . . in a designation order, which are designated by the user, as the route designated by the user and downloads a local map (including geographical data) including the corresponding route from the network server 4.

In addition, the information terminal 2 may regard a broken line-shaped route formed by connecting the plurality of points P1, P2, P3, . . . in the designation order as the route designated by the user, may regard a curved route formed by interpolating or smoothing the broken line-shaped route as the route designated by the user, or may regard a center line of the route on the map, which is closest to the broken line-shaped route as the route designated by the user.

Therefore, the user may designate a route without intersections or marks like a climbing route in the information terminal 2.

The information terminal 2 extracts positional coordinates (latitude, longitude, and altitude) of each of the plurality of points P1, P2, P3, . . . positioned on the route designated by the user from the geographical data included in the local map, and generates data in which the positional coordinates of the plurality of points P1, P2, P3, . . . are arranged in a point ascending order as data representing a spatial distribution of the route (a layout of the route in a horizontal direction, a distribution of altitudes of the route, and the like). Therefore, for example, the configuration of the route exemplified in FIG. 3 is expressed by a set of the positional coordinates to the eight points P1 to P8.

Positional coordinates (latitude, longitude, and altitude) of a point Pn are coordinates that represent the absolute position of the point Pn on the face of the earth.

In a case where the user wants to designate a detailed configuration of the route in the information terminal 2, the number of points designated on the map may be increased. In this embodiment, information of ups and downs in the route is necessary. Therefore, it is assumed that at least one or a plurality of peak points on the route and one or a plurality of valley points on the route are designated by the user.

In addition, the user may input attributes of the plurality of points included in the route to the information terminal 2. Examples of the attributes of the points include a "rest point", a "lunch point", a "junction" and a "photo point", which are the names of events, comments, and the like input by the user. For example, the attributes of the points may be input as text or may be input by selecting a plurality of icons (marks) that are prepared in advance.

In addition, when a route is designated, the user may input the name of the route, a desired date and time of each point, and the like to the information terminal 2. For example, the name and date and time may be input as text (numerical values).

In addition, the information terminal 2 generates data 132A of the route (data of a plan of climbing) on the basis of the configuration of the route designated by the user, the name of the route, the desired date and time, and the like.

Figure 4:
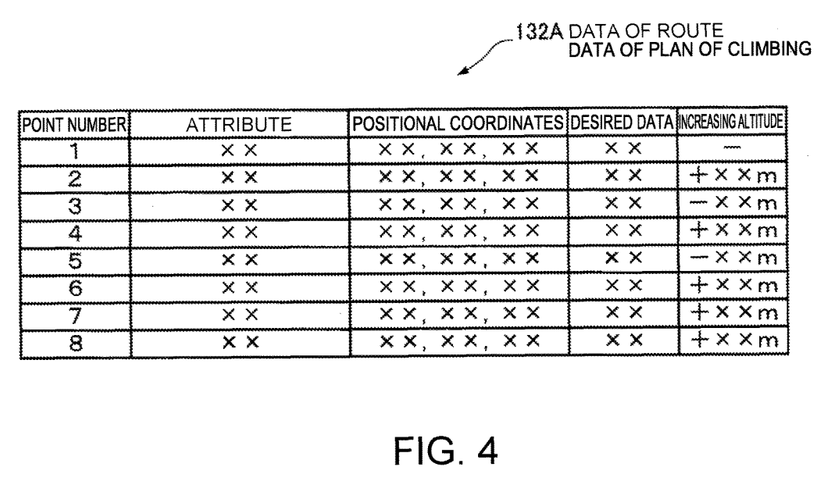
FIG. 4 is a view illustrating data of the route (data of a plan of climbing).

A structure of the data 132A of the route (the data of the plan of climbing) is visualized, for example, as illustrated in FIG. 4.

As illustrated in FIG. 4, the data 132A of the route (the data of the plan of climbing) includes data of the difference in altitude between adjacent points (increasing altitude). In FIG. 4, a point where the sign of the increasing altitude is positive is a point which is higher in altitude than the previous point, and a point where the sign of the increasing altitude is negative is a point which is lower in altitude than the previous point.

According to the data 132A of the route (the data of the plan of climbing), each of the amount of ascents in the entire route (specifically, a cumulative increasing altitude necessary for the movement in the entire route) and the amount of descents in the entire route (specifically, a cumulative decreasing altitude necessary for the movement in the entire route) can be simply calculated.

For example, the cumulative increasing altitude necessary for the movement in the entire route may be calculated by adding absolute values with positive signs together among the values of the increasing altitudes included in the data 132A of the route (the data of the plan of climbing).

In addition, the cumulative decreasing altitude necessary for the movement in the entire route may be calculated by adding absolute values with negative signs together among the values of the increasing altitudes included in the data 132A of the route (the data of the plan of climbing).

1-3. Configuration of Electronic Device and the Like

FIG. 2 is a function block diagram illustrating the configuration of the electronic device and the like.

As illustrated in FIG. 2, the electronic device 1 is configured to include a GPS sensor 110, a geomagnetic sensor 111, an atmospheric pressure sensor 112, a processing unit 120, a storage unit 130, an operation unit 150, a timekeeping unit 160, a display unit 170, a sound output unit 180, a communication unit 190, and the like. Here, the configuration of the electronic device 1 may include an omission or modification of portions of the constituent elements or an addition of other constituent elements.

The GPS sensor 110 is a sensor that generates positioning data (latitude, longitude, and altitude) representing a position of the electronic device 1 and outputs the data to the processing unit 120, and is configured to include a global positioning system (GPS) receiver and the like. The GPS sensor 110 receives electromagnetic waves in a predetermined frequency band coming from the outside through a GPS antenna (not illustrated), extracts a GPS signal from a GPS satellite, and generates the positioning data representing the position of the electronic device 1 on the basis of the GPS signal.

The geomagnetic sensor 111 is a sensor that detects a geomagnetic vector representing the direction of the magnetic field of the earth viewed from the electronic device 1, and for example, generates geomagnetic data representing the magnetic flux densities of three axis directions orthogonal to each other. As the geomagnetic sensor 111, for example, a magneto-resistive (MR) element, a magneto-impedance (MI) element, or a Hall element is used.

The atmospheric pressure sensor 112 is a sensor that detects the atmospheric pressure of a space (atmosphere) where the electronic device 1 is present, and for example, includes a pressure sensitive element in a type in which a change in the resonant frequency of a vibrator element is used (vibration type). The pressure sensitive element is a piezoelectric vibrator which is formed of a piezoelectric material such as crystal, lithium niobate, or lithium tantalite, and for example, a tuning fork type vibrator, a double-ended tuning fork type vibrator, an AT vibrator (thickness shear vibrator), a SAW resonator, and the like are applied. The output of the atmospheric pressure sensor 112 may be used to correct (or guarantee) information of altitudes included in the positioning data of the GPS sensor 11.

The processing unit 120 is formed as a central processing unit (CPU), a digital signal processor (DSP), an application specific integrated circuit (ASIC), or the like. The processing unit 120 executes various processes according to programs 133 stored in the storage unit 130 and various commands input by the user via the operation unit 150. The processes executed by the processing unit 120 include data processing for data generated by the GPS sensor 110, the geomagnetic sensor 111, the atmospheric pressure sensor 112, the timekeeping unit 160, and the like, a display process for displaying an image on the display unit 170, a sound output process for outputting sound from the sound output unit 180, and the like.

For example, the storage unit 130 is formed as a single or a plurality of IC memories or the like and includes a ROM which stores data such as the programs 133 and a RAM which becomes a work area of the processing unit 120. In addition, the RAM also includes a non-volatile RAM, and in the non-volatile RAM, a storage area for registration data 132 or the like is ensured. The programs 133 include a notification program 133A for the remaining journey (an example of an information notification program), and the registration data 132 includes the data 132A of the route (an example of information representing a distribution of altitudes of the route).

For example, the operation unit 150 is formed as a button, a key, a microphone, a touch panel, a voice recognition function, an action detection function using an accelerometer, or the like and performs a process of converting an instruction of the user into an appropriate signal and transmitting the signal to the processing unit 120.

For example, the timekeeping unit 160 is configured as a real time clock (RTC) IC or the like, generates time data such as year, month, day, hour, minute, and second, and transmits the time data to the processing unit 120.

For example, the display unit 170 is formed as a liquid crystal display (LCD), an organic electroluminescence (EL) display, an electrophoretic display (EPD), a touch panel type display, or the like and displays various images according to an instruction from the processing unit 120.

For example, the sound output unit 180 is formed as a speaker, a buzzer, a vibrator, or the like and generates various types of sound (or vibration) according to an instruction from the processing unit 120.

The communication unit 190 performs various controls for establishment of data communication between the electronic device 1 and the information terminal 2 (smartphone or the like). The communication unit 190 is configured to include a transceiver corresponding to short-range wireless communication standards such as Bluetooth (registered trademark) (including Bluetooth low energy (BTLE)), Wireless Fidelity (Wi-Fi) (registered trademark), Zigbee (registered trademark), Near field communication (NFC), and ANT+ (registered trademark).

The information terminal 2 is an information terminal such as a smartphone, a tablet PC, or a desktop PC, which can access the network 3 such as Internet, and is provided with a communication unit (not illustrated) corresponding to the communication unit 190 of the electronic device 1. In addition, in a storage unit (not illustrated) of the information terminal 2, a program for controlling the electronic device 1 is installed, and the information terminal 2 is operated according to the program when connected to at least the electronic device 1. For example, the program is downloaded from the network server 4 via the network 3 such as Internet.

The network server 4 is a network server connected to the network 3 such as Internet. The network server 4 is provided with a function of managing data uploaded from the users of the electronic device 1 for each user. In addition, the network server 4 is also provided with a function of providing programs, map data, and the like for the users of the electronic device 1.

1-4. Process of Information Terminal

Figure 5:
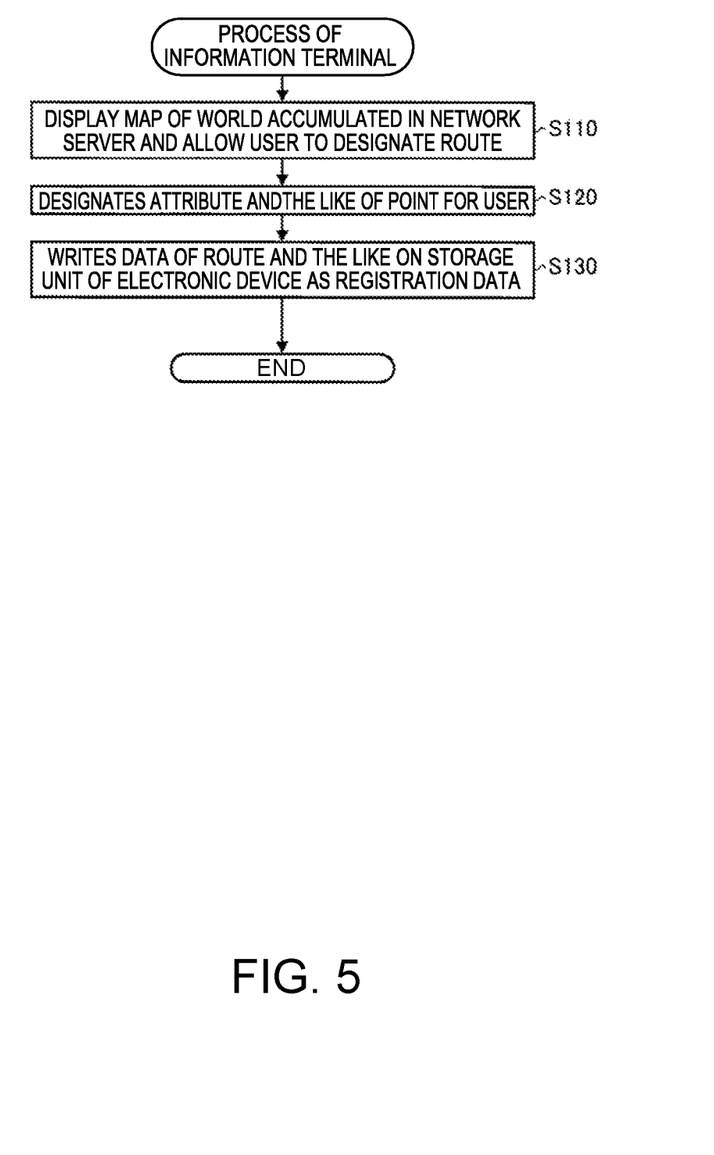
FIG. 5 is a flowchart for explaining a process of an information terminal in advance preparation.

FIG. 5 is a flowchart for explaining a process of the information terminal 2 in the advance preparation. In the advance preparation, it is assumed that the information terminal 2 is connected to the network 3 and the electronic device 1. Hereinafter, Steps of FIG. 5 will be sequentially described.

Step S110: the information terminal 2 displays a map of the world accumulated in the network server 4 and allows the user to designate a route on the map. A method of designating a route by the user is as described above (see FIG. 3 and the like).

Step S120: the information terminal 2 allows the user to designate the name of the route and attributes of each of points included in the route.

Step S130: the information terminal 2 prepares the data 132A of the route (data of a plan of climbing), a local map including the route, and the like, writes the data 132A of the route, the local map, and the like on the storage unit 130 of the electronic device 1 as the registration data 132, and ends the flow. Accordingly, registration of the route is completed.

1-5. Process of Electronic Device

Figure 6:
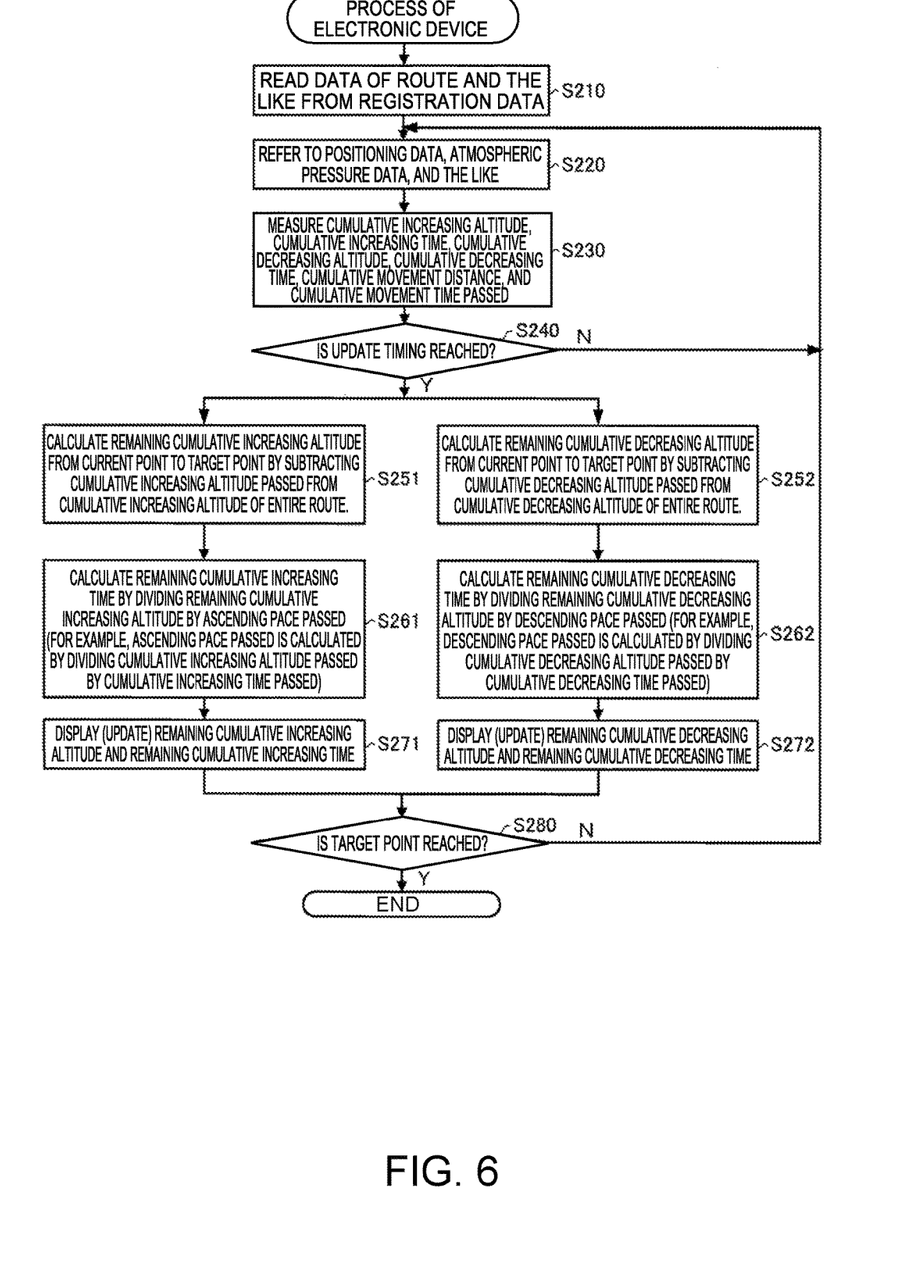
FIG. 6 is a flowchart for explaining a process of the electronic device on the day.

FIG. 6 is a flowchart for explaining a notification process of remaining journey (an example of the information notification method) of the processing unit 120 of the electronic device 1 on the day of climbing. The process is executed according to the notification program 133A for the remaining journey.

Here, it is assumed that on the day of climbing, when the user carries the electronic device 1 as a single device and positions the electronic device 1 at a start point of the route registered in advance, the user inputs an instruction to the electronic device 1 to notify the user of remaining journey including an end point of the corresponding route as a target point (an input of information to the electronic device 1 from the user is performed via the operation unit 150, and the same is applied hereinafter).

Hereinafter, Steps of FIG. 6 will be sequentially described.

Step S210: the processing unit 120 of the electronic device 1 reads the data 132A of the route (the data of the plan of climbing) from the registration data 132 of the storage unit 130.

Step S220: the processing unit 120 refers to the positioning data output from the GPS sensor 110, the atmospheric pressure data output from the atmospheric pressure sensor 112, and the time data output from the timekeeping unit 160.

Step S230: the processing unit 120 performs measurement regarding the moved journey (journey from the start point of the route to a current point) on the basis of the referred data. Here, measurement items include the following (1) to (6).

(1) a cumulative increasing altitude passed, which is necessary for movement from the start point to the current point (2) a cumulative increasing time passed, which is necessary for movement from the start point to the current point (3) a cumulative decreasing altitude passed, which is necessary for movement from the start point to the current point (4) a cumulative decreasing time passed, which is necessary for movement from the start point to the current point (5) a cumulative movement distance passed, which is necessary for movement from the start point to the current point (6) a cumulative movement time passed, which is necessary for movement from the start point to the current point In addition, during measurement of the measurement items (1) to (6), any well-known measurement method is applied. In addition, during measurement of the measurement items (1) to (6), any well-known error correction method (an averaging process, a smoothing process, an interpolation process, or the like) for suppressing measurement errors may also be applied.

The "cumulative movement distance" mentioned here may be a cumulative movement distance (movement in the altitude direction is considered) in a space or may also be a cumulative movement distance (movement in the altitude direction is not considered) on a horizontal plane (on a plane perpendicular to the direction of gravity).

Step S240: the processing unit 120 determines whether or not an update timing is reached, in a case where it is determined that the update timing is reached (Step S240Y), the flow proceeds to the subsequent Steps S251 and S252, and in a case where it is not determined that the update timing is reached (Step 5240N), the flow proceeds to Step S220.

The "update timing" mentioned here is a timing at which display or updating is to be performed in Steps S271 and S272, which will be described later. For example, the update timing is reached in any cycle of about one second to about several minutes.

Step S251: the processing unit 120 calculates the remaining cumulative increasing altitude (an example of information representing a cumulative increase amount) from the current point to the target point by subtracting the cumulative increasing altitude passed from the cumulative increasing altitude of the entire route.

For example, the cumulative increasing altitude of the entire route may be calculating by adding absolute values with positive signs together among the increasing altitudes included in the data 132A of the route (the data of the plan of climbing). That is, in Step S251, the processing unit 120 calculates the cumulative increasing altitude of the entire route on the basis of the positive increasing altitudes included in the data 132A of the route with reference to the data 132A of the route included in the registration data 132 of the storage unit 130, and calculates the remaining cumulative increasing altitude on the basis of the cumulative increasing altitude and the like.

Step S261: the processing unit 120 calculates the remaining cumulative increasing time (an example of information representing a cumulative decrease amount) by dividing the remaining cumulative increasing altitude by an ascending pace passed.

For example, the ascending pace passed may be calculated by dividing the cumulative increasing altitude passed by the cumulative increasing time passed.

Figure 7:
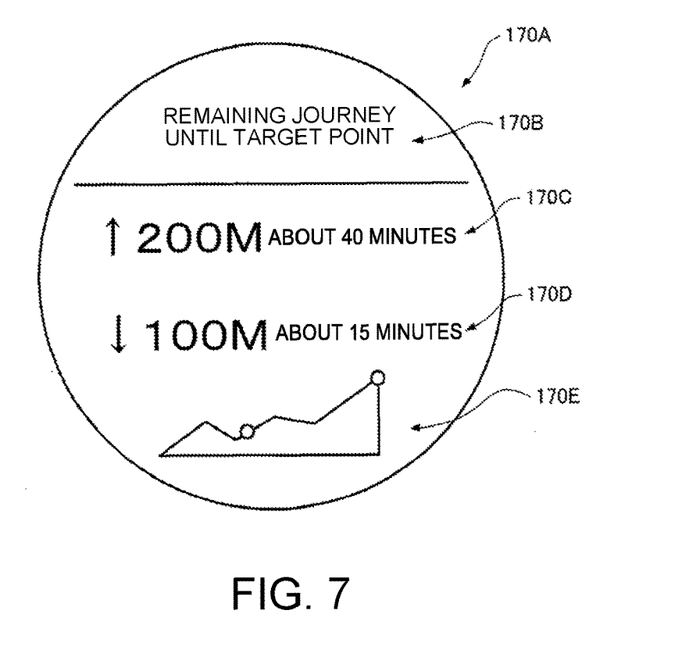
FIG. 7 is a view illustrating an example of a display screen.

Step S271: the processing unit 120 displays the remaining cumulative increasing altitude and the remaining cumulative increasing time on a display screen 170A of the display unit 170 (see FIG. 7). In addition, in the second and subsequent Step S271, the remaining cumulative increasing altitude and the remaining cumulative increasing time are updated during the display.

Step S252: the processing unit 120 calculates the remaining cumulative decreasing altitude (an example of the information representing the cumulative decrease amount) from the current point to the target point by subtracting the cumulative decreasing altitude passed from the cumulative decreasing altitude of the entire route.

For example, the cumulative decreasing altitude of the entire route may be calculated by adding absolute values with negative signs together among the increasing altitudes included in the data 132A of the route (the data of the plan of climbing). That is, in Step S252, the processing unit 120 calculates the cumulative decreasing altitude of the entire route on the basis of the negative increasing altitudes included in the data 132A of the route with reference to the data 132A of the route included in the registration data 132 of the storage unit 130, and calculates the remaining cumulative decreasing altitude on the basis of the cumulative decreasing altitude and the like.

Step S262: the processing unit 120 calculates the remaining cumulative decreasing time (an example of the information representing the cumulative decrease amount) by dividing the remaining cumulative decreasing altitude by a descending pace passed.

For example, the descending pace passed may be calculated by dividing the cumulative decreasing altitude passed by the cumulative decreasing time passed.

Step S272: the processing unit 120 displays the remaining cumulative decreasing altitude or the remaining cumulative decreasing time on the display screen 170A of the display unit 170 (see FIG. 7). In addition, in the second and subsequent Step S272, the remaining cumulative decreasing altitude and the remaining cumulative decreasing time are updated during the display.

Step S280: the processing unit 120 determines whether or not the difference between the positional coordinates of the current point and the positional coordinates of the target point is within an error range (that is, whether or not the electronic device 1 arrives at a target point), in a case where it is determined that the target point is reached (Step S280Y), the flow ends, and in a case where it is determined that the target point is not reached (Step S280N), the flow proceeds to Step S220. Steps S300 and S310 will be described later.

The sequence of Steps in the flow described above may be appropriately changed. In addition, in the flow described above, a portion of Steps may be omitted.

For example, a series of processes in Steps S251 to S271 and a series of processes in Steps S252 to S272 may be executed as parallel processing or may be executed as sequential processing.

1-6. Display Screen

FIG. 7 is a view illustrating an example of the display screen associated with a notification process of remaining journey.

FIG. 7 illustrates an example in which the display screen 170A having a circular shape like a dial of a wristwatch is provided in the display unit 170.

On the display screen 170A, for example, an image 170B representing the type of a display mode, an image 170C representing information regarding an ascent, an image 170D representing information regarding a descent, and an image 170E regarding a current point are disposed.

The image 170B is a text image such as "remaining journey until target point". Therefore, the user can recognize that the display mode is a mode associated with the "remaining journey".

The image 170C is a text image showing the value of the remaining cumulative increasing altitude (for example, "200 M") and the value of the remaining cumulative increasing time (for example, "about 40 minutes"). The remaining cumulative increasing time is an estimated time based on the previous ascending pace. Therefore, in the example illustrated in FIG. 7, in front of the text "40 minutes" representing the value of the remaining cumulative increasing time, the text "about" representing that an error is included is provided. Therefore, the user can properly recognize the amount of slopes to be climbed up to reach the target point.

The image 170D is a text image showing the value of the remaining cumulative decreasing altitude (for example, "100 M") and the value of the remaining cumulative decreasing time (for example, "about 15 minutes"). The remaining cumulative decreasing time is an estimated time based on the previous descending pace. Therefore, in the example illustrated in FIG. 7, in front of the text "15 minutes" representing the value of the remaining cumulative decreasing time, the text "about" representing that an error is included is provided. Therefore, the user can properly recognize the amount of slopes to be climbed down to reach the target point.

The image 170E is an image (section route navigation image) representing at least the distribution of altitudes of the route from the current point to the target point. For example, the section route navigation image includes the corresponding route and is a schematic sectional view of the route taken along a curve extending in the vertical direction (curtain-like curve). Therefore, the user may schematically recognize ups and downs necessary to reach the target point.

In addition, in the example illustrated in FIG. 7, the image 170C regarding an ascent is provided with an upward arrow mark "↑" when viewed from the user. "Upward" when viewed from the user is a direction toward 12 o'clock in a case where the display screen 170A is regarded as a 12-hour dial.

In addition, in the example illustrated in FIG. 7, the image 170D regarding a descent is provided with a downward arrow mark "↓" when viewed from the user. "Downward" when viewed from the user is a direction toward 6 o'clock in a case where the display screen 170A is regarded as a 12-hour dial.

Therefore, the user can simply distinguish between the information regarding an ascent (reference numeral 170C) and the information regarding a descent (reference numeral 170D) on the display screen 170A.

2. Supplement to Embodiment

In addition, the information terminal 2 in the above-described embodiment allows the user to designate a specific shape of the route (a positional relationship between a plurality of points on the route) when the route is designated by the user. However, the information terminal 2 may allow the user to designate one of existing routes which are disclosed to the public on the network 3, or one of existing routes which are disclosed to the user by the network server 4.

In addition, the processing unit 120 in the above-described embodiment sets the target point to the end point of the route but may also set the target point to any point (intermediate point) from the start point to the end point of the route. In addition, the processing unit 120 may allow the user to designate the target point.

The processing unit 120 in the above-described embodiment may set the number of routes registered in the electronic device 1 to 1 but may also set the number to two or more. In a case where the number of routes registered in the electronic device 1 is two or more, the user may be allowed to designate any one route among a plurality of the routes.

Figure 8:
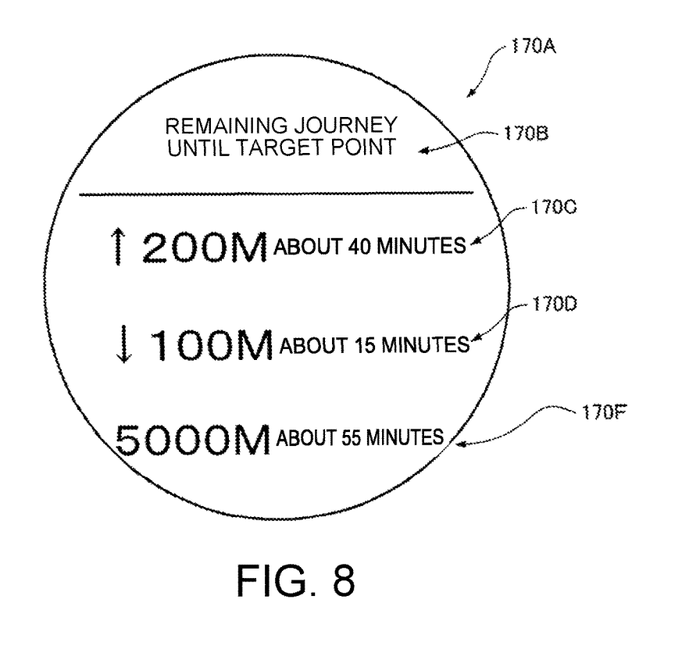
FIG. 8 is a view illustrating another example of the display screen.

The processing unit 120 in the above-described embodiment displays the section route navigation image 170E as one of pieces of information regarding the remaining journey on the display screen 170A (see FIG. 7) but may also display, instead of the section route navigation image 170E or along with the section route navigation image 170E, for example, as illustrated in FIG. 8, a text image 170F showing the remaining cumulative movement distance and the remaining cumulative movement time. In this case, for example, the processing unit 120 may execute Steps S300 and S310 shown in FIG. 9. Hereinafter, Steps S300 and S310 will be described.

Figure 9:
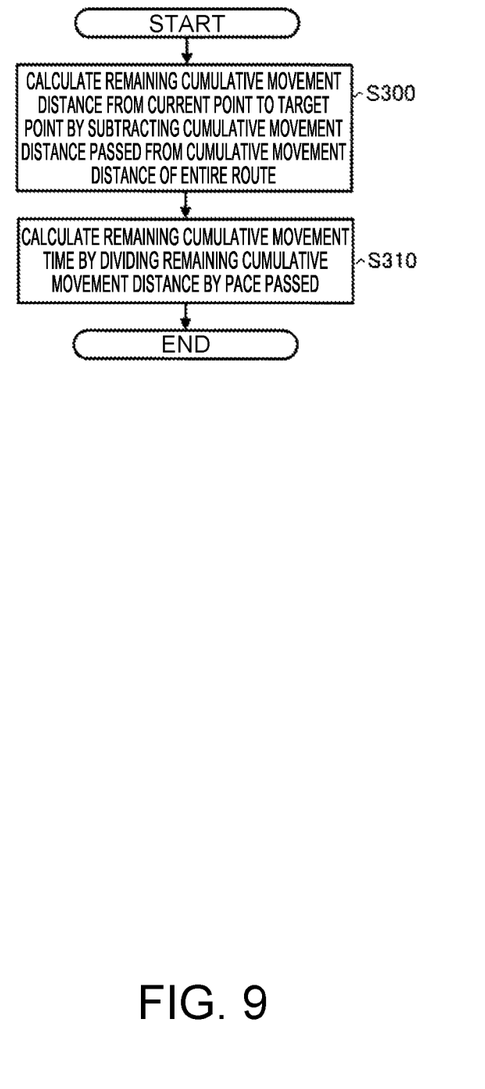
FIG. 9 is a view showing Steps S300 and S310.

Step S300: the processing unit 120 calculates the remaining cumulative movement distance from the current point to the target point by subtracting the cumulative movement distance passed from the cumulative movement distance of the entire route. The cumulative movement distance of the entire route may be calculated using the data 132A of the route and the like.

Step S310: the processing unit 120 calculates the remaining cumulative movement time by dividing the remaining cumulative movement distance by a pace passed. For example, the pace passed may be calculated by dividing the cumulative movement distance passed by the cumulative movement time passed (otherwise, the remaining cumulative movement time may be calculated by adding the remaining cumulative increasing time to the remaining cumulative decreasing time).

The processing unit 120 in the above-described embodiment performs measurement and display (updating) on all the following measurement items (1') to (6') but measurement or display (updating) of at least one of the measurement items (1') to (6') may be omitted. In a case where the remaining cumulative increase amount is displayed, the measurement item (1') or (2') is measured and displayed, and in a case where the remaining cumulative decrease amount is displayed, the measurement item (3') or (4') is measured and displayed.

(1') the remaining cumulative increasing altitude which is necessary for movement from the current point to the target point (2') the remaining cumulative increasing time which is necessary for movement from the current point to the target point (3') the remaining cumulative decreasing altitude which is necessary for movement from the current point to the target point (4') the remaining cumulative decreasing time which is necessary for movement from the current point to the target point (5') the remaining cumulative movement distance which is necessary for movement from the current point to the target point (6') the remaining cumulative movement time which is necessary for movement from the current point to the target point The processing unit 120 in the above-described embodiment may allow the user to limit those to be measured or displayed (updated) among the measurement items (1') to (6').

The processing unit 120 in the above-described embodiment uses the data 132A of the route (the data of the plan of climbing) in order to measure or display (update) at least one of the measurement items (1') to (6') but may also use data of the local map (including detailed geographical data of the route) or may also use both the data 132A of the route (the data of the plan of climbing) and the data of the local map.

The processing unit 120 in the above-described embodiment sets a display (updating) frequency (an execution frequency of Steps S271 and S272) to be lower than a measurement frequency (an execution frequency of Step S230), but may also set the display (updating) frequency and the measurement frequency to be the same.

The processing unit 120 in the above-described embodiment may further determine whether or not a time at which the user will reach the target point is in a desired arrival time on the basis of the remaining cumulative movement time, and may sequentially notify the user of the determination results. In a case where it is determined that the time is not in the desired arrival time, the processing unit 120 urges the user to change the route or may suggest another route (sub-route, escape route, or the like) to the user.

The electronic device 1 in the above-described embodiment notifies the user of the information through image display but may also notify the user through outputting of sound, vibration, or the like or by combining at least two of image display, outputting of sound, and vibration (the display unit 170 and the sound output unit 180 are examples of a notification unit).

In the above-described embodiment, a portion of the functions of the network server 4 (for example, a function regarding storage of user data) may be provided in the information terminal 2 or the electronic device 1, or a portion of the functions of the information terminal 2 or the electronic device 1 may be provided in the network server 4. In addition, in the above-described embodiment, a portion or the entirety of the functions of the electronic device 1 may be provided in the information terminal 2, or a portion or the entirety of the functions of the information terminal 2 may be provided in the electronic device 1.

3. Operation Effects of Embodiment (1) As described above, the electronic device 1 of this embodiment is a portable electronic device and includes a notification unit (the display unit 170 and the sound output unit 180) which notifies a user of information regarding a cumulative increase amount from a current point to a target point in a route designated in advance (the remaining cumulative increasing altitude and the remaining cumulative increasing time), or information regarding a cumulative decrease amount from the current point to the target point (the remaining cumulative decreasing altitude and the remaining cumulative decreasing time).

Here, during walking on a route with ups and downs such as climbing, the movement amount in an altitude direction significantly influences motivation of the user compared to movement with a vehicle or movement on a flatland. Here, the notification unit (the display unit 170 and the sound output unit 180) notifies the user of the information regarding the remaining cumulative increase amount or the remaining cumulative decrease amount until the target point (the remaining cumulative increasing altitude, the remaining cumulative decreasing altitude, the remaining cumulative increasing time, and the remaining cumulative decreasing time). Therefore, the user may recognize the amount of remaining ascents or the amount of remaining descents until the target point through the notification by the electronic device 1. Accordingly, the electronic device 1 of the embodiment is effective in maintaining motivation of the user or reexamining the plan of climbing.

(2) The electronic device 1 of this embodiment further includes the storage unit 130 which stores information representing a distribution of altitudes of the route (the data 132A of the route), and the notification unit (the display unit 170 and the sound output unit 180) notifies the information regarding the cumulative increase amount or the information regarding the cumulative decrease amount on the basis of the information representing the distribution of altitudes.

Therefore, the notification unit (the display unit 170 and the sound output unit 180) causes the information regarding the remaining cumulative increase amount or the remaining cumulative decrease amount to reflect the distribution of the route in the altitude direction. Accordingly, the electronic device 1 may more accurately notify the user of the remaining cumulative increase amount or the remaining cumulative decrease amount.

(3) In the electronic device 1 of this embodiment, the information regarding the cumulative increase amount includes the remaining cumulative increasing altitude which is necessary for movement from the current point to the target point or the remaining cumulative increasing time which is necessary for movement from the current point to the target point, and the information regarding the cumulative decrease amount includes the remaining cumulative decreasing altitude which is necessary for movement from the current point to the target point or the remaining cumulative decreasing time which is necessary for movement from the current point to the target point.

Therefore, the user may be notified by the electronic device 1 of the amount of remaining ascents or the amount of remaining descents until the target point in units of time or altitude.

(4) In the electronic device 1 of this embodiment, the notification unit further notifies the user of a cumulative movement distance from the current point to the target point, or a cumulative movement time from the current point to the target point.

Therefore, the user may be further notified by the electronic device 1 of the remaining movement amount until the target point.

(5) In the electronic device 1 of this embodiment, the target point is an end point of the route.

Therefore, the user may be notified by the electronic device 1 of the amount of remaining ascents or the amount of remaining descents until the end point of the route.

(6) In the electronic device 1 of this embodiment, the target point is an intermediate point of the route designated by the user in advance.

Therefore, the user may be notified by the electronic device 1 of the amount of remaining ascents or the amount of remaining descents until the intermediate point of the route.

(7) The electronic device 1 of this embodiment is able to be worn by a predetermined part of the user.

Therefore, the user can check information without holding the electronic device 1 with a hand. Accordingly, the electronic device 1 is appropriate for sports such as walking, running, trail running, climbing, and bicycling.

(8) In the electronic device 1 of this embodiment, the predetermined part is an arm or a wrist.

Therefore, the user may use the electronic device 1 with the same sensation as that of a wristwatch or the like.

4. Other Modification Examples

The invention is not limited to the above-described embodiment, and various modifications can be made without departing from the gist of the invention.

For example, the electronic device 1 or the information terminal 2 may be provided with well-known smartphone functions such as a camera function, a call function, and a motion sensing function (for example, an inertial sensor such as an accelerometer or an angular rate sensor).

The electronic device 1 or the information terminal 2 may also be provided with a sensing function associated with body activities, such as a temperature sensor, a humidity sensor, and a pulse sensor.

The electronic device 1 or the information terminal 2 may be formed as various types of portable information devices such as a wrist type electronic device, a smartphone, and a head mounted display (HMD).

The electronic device 1 of the above-described embodiment or the information terminal 2 notifies the user of the information through image display but may also notify the user through outputting of sound, vibration, or the like or by combining at least two of image display, outputting of sound, and vibration.

In addition, in the above-described embodiment, a global positioning system (GPS) is used as a global satellite positioning system. However, another global navigation satellite system (GNSS) may also be used. For example, one or two or more of satellite positioning systems such as the European Geostationary-Satellite Navigation Overlay Service (EGNOS), the Quasi Zenith Satellite System (QZSS), the GLObal NAvigation Satellite System (GLONASS), Galileo, and the BeiDou Navigation Satellite System (BeiDou) may be used. In addition, a satellite-based augmentation system (SBAS) such as the Wide Area Augmentation System (WAAS) and the European Geostationary-Satellite Navigation Overlay Service (EGNOS) may be used for at least one of the satellite positioning systems.

Each of the embodiment and modification examples described above is merely an example, and the invention is not limited thereto. For example, the embodiment and the modification examples may be appropriately combined.

The invention includes substantially the same configurations (for example, the configurations having the same functions, methods, and results or the configurations having the same purposes and effects) as the configurations described in the embodiment. The invention includes a configuration in which non-essential parts in the configurations described in the embodiment are substituted. The invention includes a configuration which exhibits the same operational effects as those of the configurations described in the embodiment or a configuration which achieves the same purposes as those thereof. In addition, the invention includes a configuration in which well-known techniques are added to the configurations described in the embodiment.

What is claimed is:

1. An electronic device comprising:
a GPS sensor configured to detect a current point;
a storage unit configured to store information representing a distribution of altitudes of the a route, wherein the route comprises a plurality of portions comprising a plurality of ascent portions, and at least one descent portion;
a processing unit configured to calculate a cumulative altitude increase amount for the route based on the plurality of ascent portions, and a remaining cumulative altitude increase amount from the detected current point to a target point on the route based on the detected current point and the cumulative altitude increase amount; and
a display unit configured to display information regarding the remaining cumulative altitude increase amount.

2. The electronic device according to claim 1,
wherein the processing unit is further configured to calculate a cumulative altitude decrease amount for the route based on the at least one descent portion, and a remaining cumulative altitude decrease amount from the detected current point to the target point on the route based on the detected current point and the cumulative altitude decrease amount; and
wherein the display unit is further configured to display information regarding the remaining cumulative altitude decrease amount simultaneously with the information regarding the cumulative altitude increase amount.

3. The electronic device according to claim 2,
wherein the information regarding the remaining cumulative altitude increase amount includes a remaining cumulative altitude increasing time which is necessary for movement from the current point to the target point, and
the information regarding the remaining cumulative altitude decrease amount includes a remaining cumulative altitude decreasing time which is necessary for movement from the current point to the target point.

4. The electronic device according to claim 1, wherein the display unit is configured to display cumulative movement distance from the current point to the target point, or a cumulative movement time from the current point to the target point.

5. The electronic device according to claim 1, wherein the target point is an end point of the route.

6. The electronic device according to claim 1, wherein the target point is an intermediate point of the route designated by the user in advance.

7. The electronic device according to claim 1, wherein the electronic device is able to be worn by a predetermined part of the user.

8. The electronic device according to claim 7, wherein the predetermined part is an arm or a wrist.

9. An information notification method comprising:
detecting a current point with a GPS sensor;
storing, with a storage unit, a route comprising a plurality of portions comprising a plurality of ascent portions, and at least one descent portion;
calculating, with a processing unit, a cumulative altitude increase amount for the route based on the plurality of ascent portions, and a remaining cumulative altitude increase amount from the detected current point to a target point on the route based on the detected current point and the cumulative altitude increase amount; and
notifying a user of information regarding the remaining cumulative altitude increase amount.

10. The information notification method according to claim 9, further comprising:
calculating a cumulative altitude decrease amount for the route based on the at least one descent portion, and a remaining cumulative altitude decrease amount from the detected current point to the target point on the route based on the detected current point and the cumulative altitude decrease amount; and
notifying the user of information regarding the remaining cumulative altitude decrease amount simultaneously with the information regarding the cumulative altitude increase amount.

11. The information notification method according to claim 10,
wherein the information regarding the remaining cumulative altitude increase amount includes a remaining cumulative altitude increasing time which is necessary for movement from the current point to the target point, and
the information regarding the cumulative altitude decrease amount includes a remaining cumulative altitude decreasing time which is necessary for movement from the current point to the target point.

12. The information notification method according to claim 9,
wherein, in the notifying, a cumulative movement distance from the current point to the target point, or a cumulative movement time from the current point to the target point is notified to the user.

13. The information notification method according to claim 9,
wherein the target point is an end point of the route.

14. The information notification method according to claim 9,
wherein the target point is an intermediate point of the route designated by the user in advance.

15. An electronic device comprising:
a GPS sensor configured to detect a current point;
a storage unit configured to store information representing a distribution of altitudes of the a route, wherein the route comprises a plurality of portions comprising a at least one ascent portion, and a plurality of descent portions;
a processing unit configured to calculate a cumulative altitude decrease amount for the route based on the plurality of descent portions, and a remaining cumulative altitude decrease amount from the detected current point to a target point on the route based on the detected current point and the cumulative altitude decrease amount; and
a display unit configured to display information regarding the remaining cumulative decrease.

16. The electronic device according to claim 15,
wherein the processing unit is further configured to calculate a cumulative altitude increase amount for the route based on the at least one ascent portion, and a remaining cumulative altitude increase amount from the detected current point to the target point on the route based on the detected current point and the cumulative altitude increase amount; and
wherein the display unit is further configured to display information regarding the remaining cumulative altitude increase amount simultaneously with the information regarding the cumulative altitude decrease amount.

17. The electronic device according to claim 16,
wherein the information regarding the remaining cumulative altitude increase amount includes a remaining cumulative altitude increasing time which is necessary for movement from the current point to the target point, and
the information regarding the remaining cumulative altitude decrease amount includes a remaining cumulative altitude decreasing time which is necessary for movement from the current point to the target point.

18. The electronic device according to claim 15,
wherein the display unit is configured to display a cumulative movement distance from the current point to the target point, or a cumulative movement time from the current point to the target point is notified to the user.

19. The electronic device according to claim 15,
wherein the target point is an end point of the route.

20. The electronic device according to claim 15,
wherein the target point is an intermediate point of the route designated by the user in advance.

21. The electronic device according to claim 15,
wherein the electronic device is able to be worn by a predetermined part of the user.

22. The electronic device according to claim 21,
wherein the predetermined part is an arm or a wrist.

* * * * *